Dec. 8, 1936.  G. C. WOODRUFF  2,063,652
METHOD OF HANDLING AND SHIPPING FLOUR AND LIKE MATERIALS
Original Filed Feb. 9, 1934   7 Sheets-Sheet 1

Dec. 8, 1936.   G. C. WOODRUFF   2,063,652
METHOD OF HANDLING AND SHIPPING FLOUR AND LIKE MATERIALS
Original Filed Feb. 9, 1934    7 Sheets-Sheet 2

Dec. 8, 1936.  G. C. WOODRUFF  2,063,652

METHOD OF HANDLING AND SHIPPING FLOUR AND LIKE MATERIALS

Original Filed Feb. 9, 1934  7 Sheets-Sheet 3

Inventor
Graham C Woodruff
By
Attorney

Dec. 8, 1936. G. C. WOODRUFF 2,063,652
METHOD OF HANDLING AND SHIPPING FLOUR AND LIKE MATERIALS
Original Filed Feb. 9, 1934 7 Sheets-Sheet 4

Dec. 8, 1936.  G. C. WOODRUFF  2,063,652
METHOD OF HANDLING AND SHIPPING FLOUR AND LIKE MATERIALS
Original Filed Feb. 9, 1934   7 Sheets-Sheet 5

Patented Dec. 8, 1936

2,063,652

UNITED STATES PATENT OFFICE 2,063,652

METHOD OF HANDLING AND SHIPPING FLOUR AND LIKE MATERIALS

Graham C. Woodruff, Bronxville, N. Y., assignor to The L. C. L. Corporation, a corporation of Delaware Original application February 9, 1934, Serial No. 710,577, Patent No. 2,020,628. Divided and this application June 27, 1935, Serial No. 28,743

3 Claims. (Cl. 214—152)

This application is a division of my application filed February 9, 1934, Serial No. 710,577, which has since matured into Patent No. 2,020,628, dated November 12, 1935.

This invention relates to a method of handling and shipping flour and like materials in bulk so as to effect economy in the shipment of such materials in large quantities while preventing loss of the material or damage thereto in transit and delivering the material to a consignee in the best possible form for intended use.

Flour and other like materials are generally packed for shipment in bags or sacks and transported in ordinary freight cars. The cost of packing and transporting the material in this manner is not only high, but there are losses of the material due to bursting of bags, exposure of the material to the ravages of rats, mice and insects, and to the action of the elements, and damages due to other and varied causes. As a result transportation companies are compelled to pay large sums in settlement of claims for damages, and consignees are themselves put to great annoyance, inconvenience and expense because of uncertainties as to reliability of shipments incident to such shipping hazards. Moreover, the shipment of flour and like pulverulent cereals in bulk is attended with the difficulty that the material packs solidly in transit, requiring it to be loosened up and aerated after shipment before it can be put to its intended use.

One object of my invention is to provide a method whereby flour or a similar material may be loaded in large bulk quantities into transport receptacles, conveyed from the loading point to a destination point, and unloaded from the receptacles and into suitable receivers at the destination point, in such a manner as to greatly reduce the cost of transportation and labor in handling, while protecting the commodities from contamination and from various other losses commonly sustained while such commodities are in transit.

A further object of the invention is to provide a method whereby flour and other similar pulverulent or granular materials may be shipped from place to place with great economy and advantage to consignors, consignees and transportation companies.

A still further object of the invention is to provide a method whereby flour and like materials may be shipped in bulk so as to avoid the necessity of packaging the same in sacks or bags, and the loss of time, labor and other expenses incident thereto, and in such manner as to aerate the material in its course of transfer, so as to prevent the material from packing too solidly or densely in transit, as well as to obviate the necessity of aerating the material as is required with some materials, such as flour, for example, before such material is put to its predestined use.

A still further object of the invention is to provide a method for transporting materials, such as flour, liable to be contaminated or damaged by insects in storage or transit, whereby such materials will be protected against the access thereto of foreign materials or by the ravages of insect life.

A still further object of the invention is to provide a method of a simple, efficient and reliable character for carrying the aforesaid objects of the invention into practical effect.

In the accompanying drawings I have shown for exemplification certain means for carrying my method into practical effect without, however, limiting my invention thereto, in which drawings:—

Figure 9:
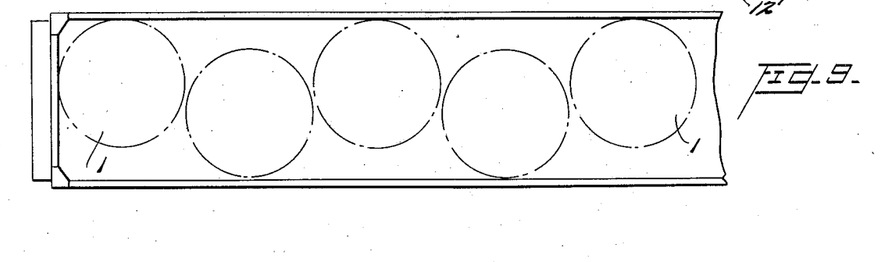
Fig. 9 is a view similar to Fig. 5 showing a modification.

In carrying my invention into practice the material to be conveyed from one point to another is designed to be shipped in air-tight containers 1, mounted for transport purposes on a container car or a container truck of either of the forms herein disclosed, which container is provided with means whereby it may be loaded with the material by either gravity or air pressure and also provided with means whereby the material may be discharged therefrom by air pressure through suitable discharge conductors. A longitudinal row or group of such containers 1 may be mounted in practice upon a container car 2 in such manner that the units may be individually reached in a ready and convenient manner for loading and unloading purposes. The car 2 herein shown is a container car of gondola type, having a floor 3 on which the containers 1 rest and provided with side and end walls 4 and 5 which are of sufficient height to prevent displacement of the containers from the car even in the event that any of the individual containers should become unfastened in transit. The car, however, may be one of flat or platform type having suitable means for securing the containers to its floor or platform. The containers may be of any suitable size and capacity and they may be arranged in longitudinal alinement, as shown in Figs. 1, 3, 4 and 12, allowing a certain number of containers, six for example, as shown in the present instance, to be mounted on a car. The containers, however, may be set somewhat closer together than shown in Figs. 1, 3, 4 and 12, and arranged in staggered relation, as shown in Fig. 9, so that a similar number of containers of larger diameter and greater capacity may be mounted on a car having the same amount of available floor space.

Each container 1 comprises a cylindrical vessel, built as a pressure vessel, and consists of a cylindrical shell having a hopper bottom 6 and a dished head 7, all strongly welded together. To enable this container vessel to be firmly supported on the car floor 3, the cylindrical shell is extended downwardly in the form of a cylindrical base 7' forming a compartment 8 about the conical portion of the tank. This compartment is conveniently accessible through an opening 9 provided in one of its sides, which opening may be or not, as desired, closed by a hinged or other suitably mounted door. The parts 6 and 7 of the container are stiffened by suitable gussets 10 and the lower edge of the part 7' is provided with suitable guiding and positioning retainers 11 to engage segmental holding brackets 12 in the car floor, whereby the containers, which are also adapted to engage retainer brackets 12' on the sides of the car, will be held in fixed position and against rotational shifting while the car is in transit, but at the same time will be free from positive fastening connection with the car so that the containers are readily removable from the car whenever desired. At its top each container is provided with lifting links or loops 13 by means of which they may be engaged by a lifting crane or other hoisting apparatus for convenient transfer from the car to a loading platform, or vice versa, or between a car or loading platform and a ship, or between a car or ship and a transportation truck, thus allowing of the ready transfer of loaded or unloaded containers between stationary platforms or boxes at loading points and transportation vehicles, or between transportation vehicles of different character.

Each container 1 is provided at its top with a main control filling mouth or inlet 14 and with an auxiliary filling mouth or inlet 15, which are normally closed by suitable air, water and dust-proof caps or closures 16 and 17, and which closures, after the container is filled, may be locked or sealed in any approved manner against surreptitious removal. The main inlet 14 provides an inlet of comparatively large size adapting the container to be filled by gravity from a feed chute or the like, while the inlet 15 is of relatively smaller size and designed to receive a flexible tube or conductor of suitable size through which the container may be filled, when occasion requires, through such conductor by air pressure. The inlets 14 and 15 are preferably provided with suitable valves 14' and 15' adapted to open automatically by gravity or spring external pressure when the closures 16 and 17 are removed, but close under internal pressure. The material is discharged from the container through an outlet in its hopper bottom 6, with which outlet is connected a discharge fitting 18 adapted for the connection therewith of a suitable discharge conductor. Arranged in the compartment 8 so as to be housed and protected thereby may be suitable parts or fittings of an air supply system. The parts or fittings shown as applied to each tank consist of an air feed pipe 19 having a valved inlet connection 20 and from which pipe 19 lead supply branches 21 and 22 connected respectively with the hopper bottom 6 and the interior of the container at the top thereof, whereby air under pressure may be simultaneously supplied to the hopper bottom to promote the discharge of the material through the outlet connection 18 and supplied at the top of the container to place a proper head pressure on the body of the material therein. A valve 23 may be placed in the pipe 19 at its point of connection with the branch 22 to regulate the flow of air through such branch and to cut off the flow whenever desired. The pressure of the air supplied from a suitable source through the pipe 19 may be such as in practice is suitable for discharging the material through a discharge conductor of a required given size and at any desired or predetermined rate. In practice the pressure may be such as is necessary to convey the material through a comparatively long conductor when a receiving bin or the like at a destination point is disposed some distance from the container from which the material is being discharged. The doorway or access opening in the base of each container is arranged in practice so as to face an access opening 24 in one of the sides of the car 2 so that convenient access may be obtained to the hopper outlet and fixtures, while at the same time the fixtures applied to the base of the container will be protected against injury by contact with extraneous objects in the travel of the container car.

Figure 1:
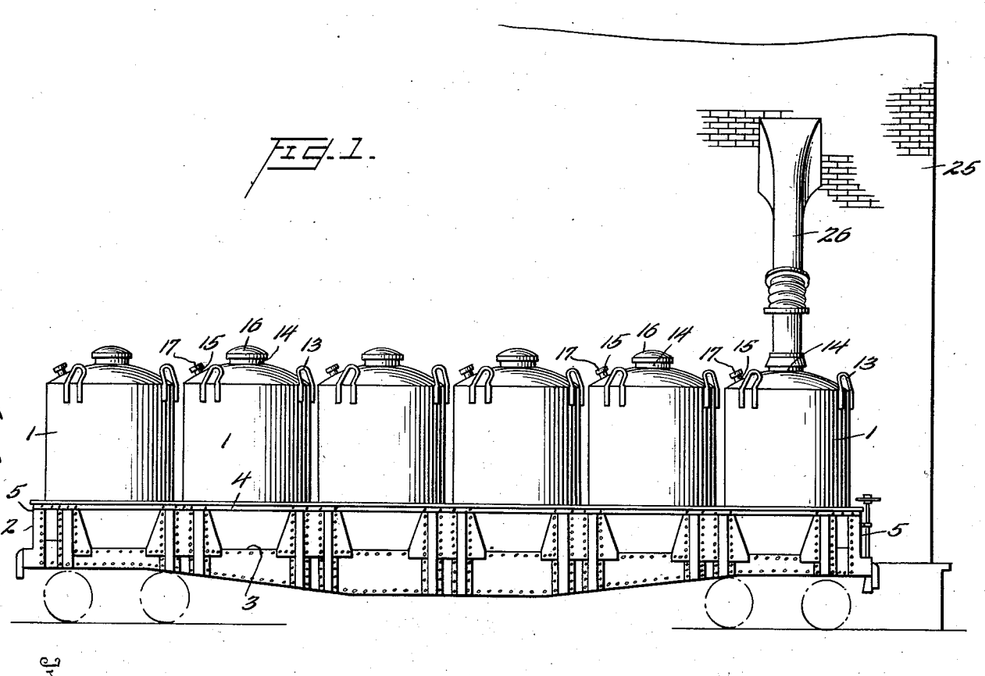
Fig. 1 is a side elevation of a container freight car carrying transport containers constructed in accordance with the invention for transporting flour and like commodities, and showing the same as arranged at a shipping point for the loading of the containers with the material being transported.
Figure 2:
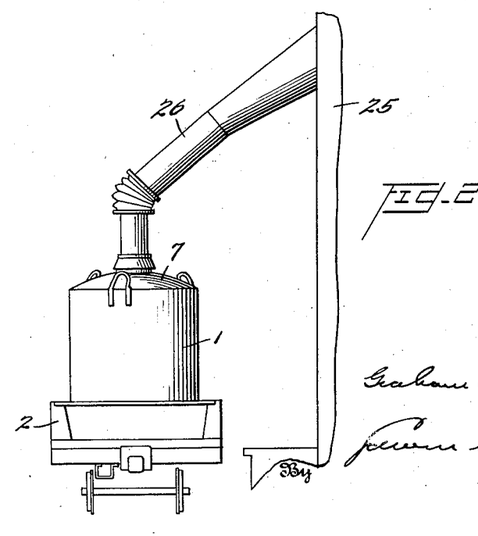
Fig. 2 is an end elevation of the container car, containers and loading means shown in Fig. 1.
Figure 3:
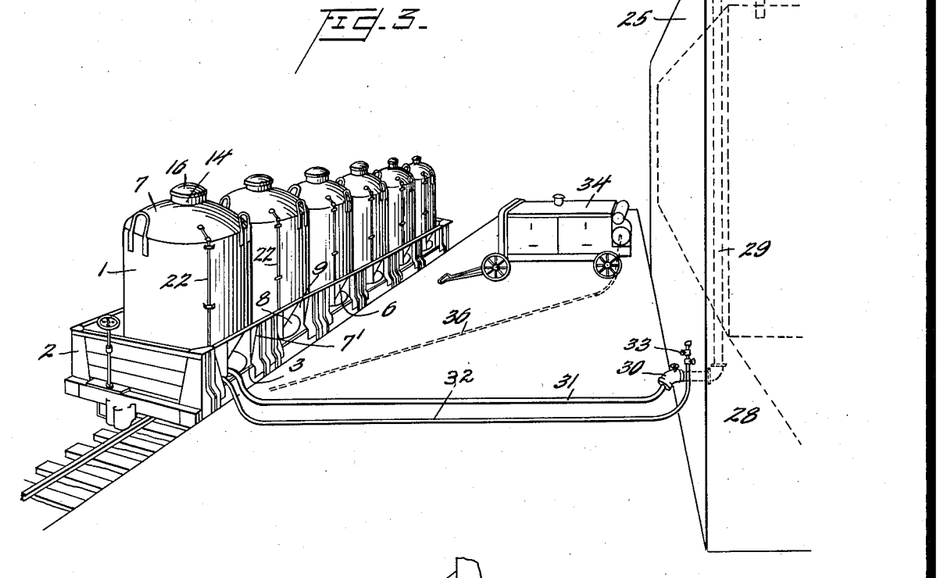
Fig. 3 is a perspective view of a container car arranged at a delivery point for an unloading action and showing the air supply and unloading conductors of a consignee's stationary plant as employed for an unloading action, and also showing a portable air compressor in position to be available for use if required.
Figure 4:
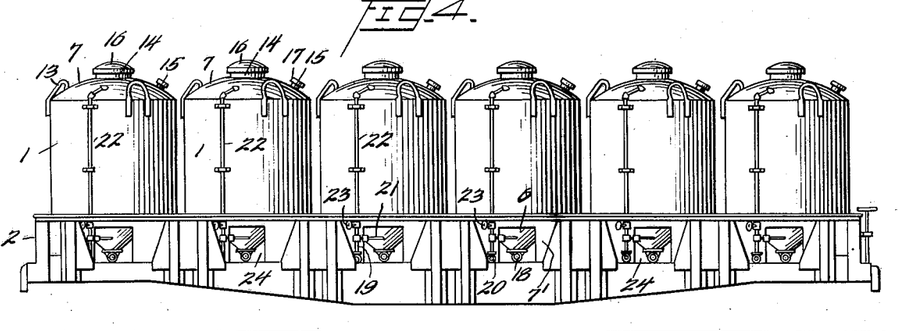
Fig. 4 is a view in elevation of the container car and battery of containers thereon looking toward the opposite side from that shown in Fig. 1.

Figs. 1 and 2 show a manner of loading a battery of containers 1 on a container car 2 disposed on a side track alongside a shipper's mill 25 for the loading of the containers with flour or a like product which is to be shipped from the consignor miller to a storage warehouse, bakery establishment or other consignee at a more or less distant point. The containers when so disposed may be individually or simultaneously filled through one or more discharge chutes 26 connected with their main filling mouths or inlets, which mouths or inlets of the containers are closed and sealed after the containers are filled. The loaded containers on the car 2 are then transported to the destination point where the containers, or one or more of them, are to be unloaded. Fig. 3 shows the car 2 arranged on a side track alongside a consignee's storage warehouse or bakery 27 having therein a storage bin 28 with which connects a filling pipe 29 provided with a valved inlet connection 30 located outside the building, to which connection may be coupled a flexible unloading pipe or tube 31 designed to be attached to the discharge outlet connection of any one of the containers 1. Fig. 3 also shows an air pressure supply pipe 32 leading from a valved connection 33 forming part of a permanent compressed air supply equipment at the consignee's plant, which pipe is connected with the air inlet connection 20 of the air supply pipe 19 of the container which is to be unloaded for the supply of air under pressure thereto. The proper valves being open for the feed of air to the container from the supply plant, the contents of the tank will be forced from the container into the pipe 31 and from the latter through the pipe 29 into the storage bin or receiver 28, it being understood that in this operation the air through the pipe connection 21 will immediately force the material through the outlet connection 18, while the air supplied through the pipe connection 22 will enter the top of the tank and prevent the formation of any vacuum therein and supply a head pressure to loosen up and force the material down toward the bottom of the container to secure its free discharge. In this manner the containers, or any number of them to be unloaded at the same point, may be easily and quickly relieved of their contents, and by the use of a proper number of supply connections all or any suitable number of the containers may be unloaded at one and the same time.

The above-described mode of delivery of the material directly from containers on a transport freight car applies, of course under conditions where the consignee's plant is provided with a permanent air compressor installation for the purpose of supplying the necessary air feed pressure. In case, however, that the plant is not supplied with a fixed and permanent air pressure supply equipment, a portable air compressor 34 of the type shown in Fig. 3 may be used. This may be in the form of a hand or motor propelled truck 35 provided thereon with an air compressor driven by a contained internal combustion or electric motor, and having a suitably controlled air outlet for attachment of an air supply pipe 36 designed to be connected with the air inlet connection 20 of the container, which type of compressor may be used at different points in a consignee's plant when side tracks are available at one or more points for loading operations at such points and may be stored at any convenient place within the plant when not in use.

Figure 10:
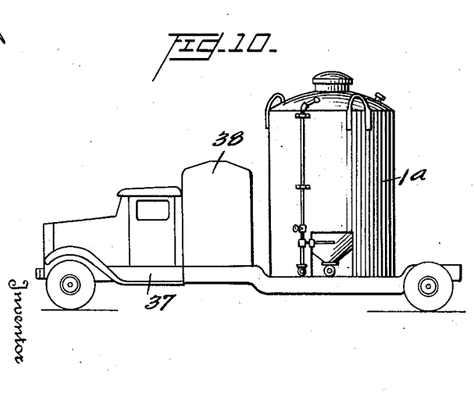
Fig. 10 is a view of a motor truck which may be used as a transport vehicle in carrying out the invention.
Figure 11:
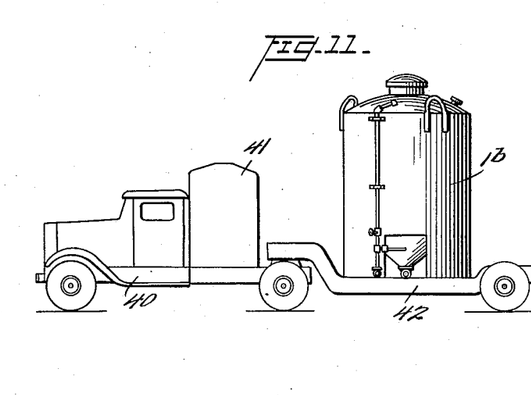
Fig. 11 is a similar view of a motor truck with trailer adapted for use for the same purpose.
Figure 12:
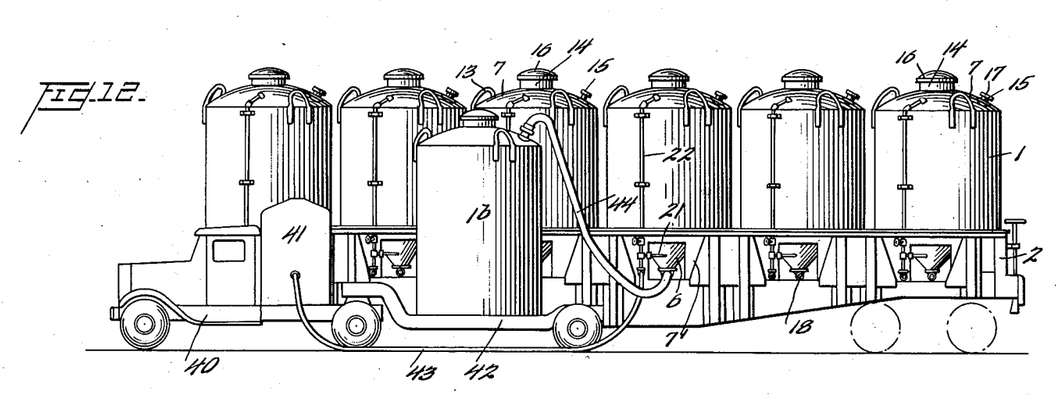
Fig. 12 is a side elevation of a container car and containers and a trailer truck of the type shown in Fig. 11, illustrating the use of a master container on the truck to receive material from a container on the car.

It is necessary, however, that such a system of loading, unloading and transporting commodities of the character set forth be sufficiently flexible to enable it to be employed under other conditions, as where, for example, there is no side track or other track connection available for running the container car to the consignee's plant, or where no supply of compressed air is available at the plant, or where compressed air may be available at the plant for use but no side track is available and it is desired to unload the containers directly in a railroad yard and convey the material therefrom to the plant or it is desired, in lieu thereof, to transport the containers from the railroad car to the consignee's plant for the unloading operation. In order to enable these various requirements to be met, I may provide, as shown in Fig. 10, a transport motor truck 37 carrying an air compressor 38 operated by the motor thereof or by an independent motor, and the frame or chassis 39 of which is adapted to support a master container 1a, similar in type to the containers 1, or, in lieu thereof, and as shown in Fig. 11, I may provide a motor truck 40 of tractor type having mounted thereon a compressor 41 which may be driven either by the engine thereof or by an independent engine and which is adapted for the connection therewith of a trailer 42 on which a master container 1b similar to the containers 1 or 1a may be mounted. The motor truck of either type may be used for individually transporting the containers 1 from the car 2 to a consignee's plant or place of destination, when there are no trackage accommodations at the destination point and, if desired, the compressed air equipment of the truck may be employed at the destination point or consignee's plant for the purpose of discharging the material from the container thereon into the bin or other receptacle at the plant. The use of a master container in place of a regular or conventional container 1a may be optional in many cases and obligatory in others, obligatory when it is necessary, because of limitations of motor truck width, not admitting of the reception thereon of a regular container, to substitute therefor a master container which is of less diameter than a regular container but of greater height or otherwise proportioned to have the same receiving capacity. Either form of motor truck transport may be adapted for use interchangeably with regular containers or a special or master container to render the system sufficiently applicable to meet various contingencies in service. Where a master container 1a or 1b is used on the transport truck, there will, of necessity, be an intermediate transfer of material from a container on the container car to the master container before delivery of the material to the consignee's bin or receiver.

Figure 13:
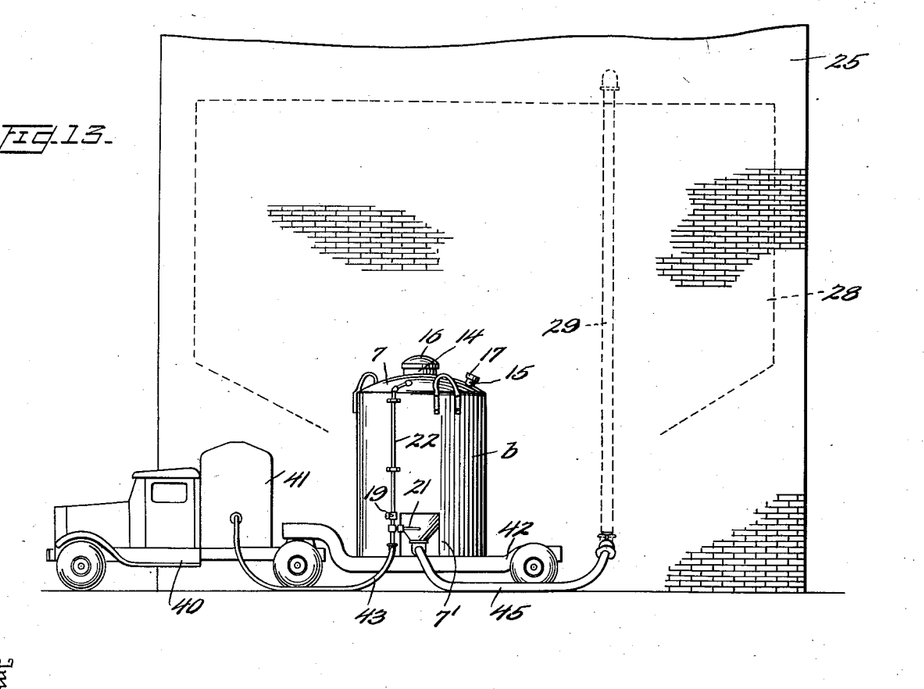
Fig. 13 is a view showing the trailer truck with master container in delivery position for unloading the material from the master container to a consignee's storage bin.

For the purpose of enabling this transfer action from the car container to the master container to be effected the air compressor apparatus of the truck may be employed to furnish the air under pressure through a flexible pipe 43 to the inlet of the container which is to be unloaded, while a flexible unloading pipe 44 is used to connect the discharge outlet of the car container with the auxiliary inlet 15 of the master container on the truck through which latter the master container will be filled. The master container may also be filled by inserting flexible unloading pipe 44 in the main inlet opening 14. The truck bearing the master container will then convey its load to the point of destination or consignee's plant, where the load may be discharged from the master container in the manner illustrated in Fig. 13. In effecting this discharge of the load from the master container 1b to the bin or receptacle 28 in the consignee's plant, the compressor on the truck is connected by the pipe 43 to the air pipe on the master container and an unloading pipe 45 is employed to connect the container outlet with the filling pipe 29 so that compressed air will be supplied from the truck compressor to discharge the load from the master container into the bin or receptacle.

The use of my method of unloading, transporting and loading receptacles will be found especially advantageous in the transportation of wheat and other flour from a mill or storage point to a bakery establishment or the like where it is to be utilized for baking into bread or for other purposes. Wheat and other flour, for sanitary and other reasons, can not desirably be shipped in the ordinary manner in bulk, and it is therefore necessary to package it and ship it either in paper bags or in bags of gunnysack or similar material. This involves the expense attached to the cost of the bags, which is wholly lost in the case of paper bags, as well as the expense of loading the flour into and unloading it from the bags. In the case of the use of gunnysack bags, the emptied bags may be salvaged and returned to the shipper and a certain rebate secured, but this involves expenses due to handling, bookkeeping and losses of bags due to wear and tear and in shipment. My invention obviously avoids all of these objections in doing away with the use of bags and packaging operations and allowing the flour to be shipped in bulk at greatly decreased expense. Moreover, large losses which are sustained in the shipment of flour and like materials in bags, due to damages of various kinds are avoided, as the material is shipped in air-tight containers from the shipping to the destination point and delivery at the delivery point into a receiving receptacle without being subject to physical or other damage or to contamination of any sort from exposure.

Figure 14:
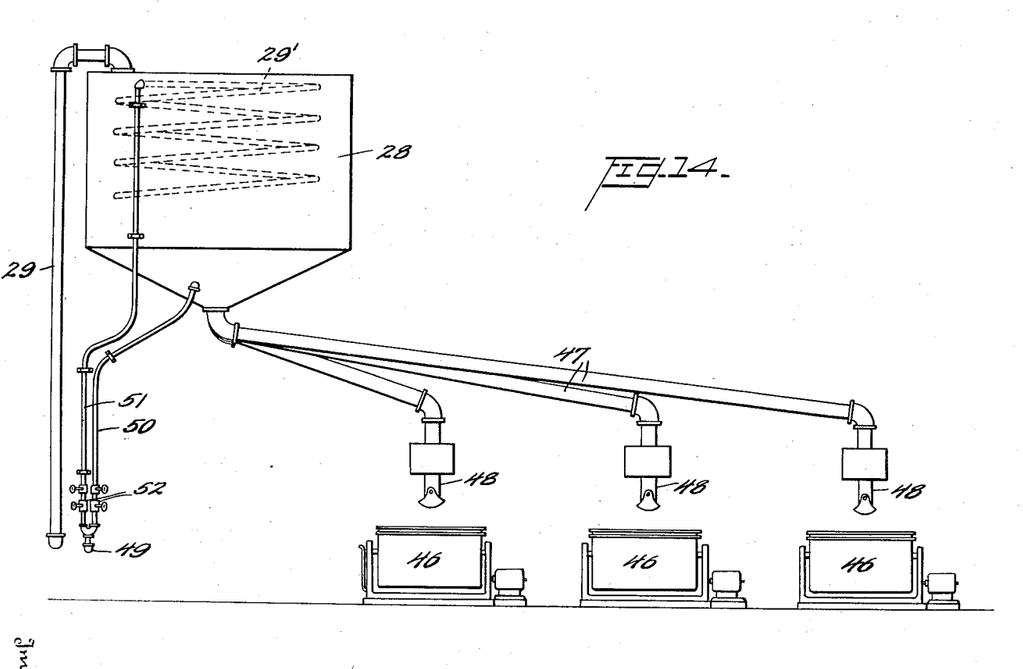
Fig. 14 is a view illustrating an arrangement of storage bin which may be located in a bakery to receive flour from a transport container, together with means for delivering the flour by air pressure therefrom to mixers and aerating the flour during the delivery action.

Fig. 14 of the drawings shows another advantage secured by my invention in the handling of flour in a bakery while in storage in the bins 28 thereof and during transportation from the bins to mixers 46 or other flour treatment or bread making apparatus. Flour which is packed for transportation or storage for any material period tends to pack more or less solidly, for which reason it must be loosened up and aerated in the bakery prior to use. In such packed or solid condition it is also subject to heating, with the result of promoting and increasing the growth and spread of any insect life which may exist therein. By packing and shipping the flour in the pressure containers embodying my invention and by the compressed air method of discharging the flour from the containers, or packing it therein, and conveying it under the air pressure to points desired, the packed flour is broken up and loosened to a very effective degree and is aerated during this action, by which the process of aging the flour is also promoted and hastened, so that the flour supplied to the storage bins 28 at the bakery plant will be placed primarily in fine condition for immediate use if desired. This aeration of the flour, whereby all particles of the flour are turned and exposed to the air streams, also serves to cool the flour and to inhibit any growth or spread of insect life therein. Fig. 14 of the drawing shows that this desirable feature and aeration principle may be employed in the bakery and that the compressed air supplying plant employed in the bakery for unloading the delivered flour from the containers to the bins may also be used for storing up the flour in the bins and discharging it under pressure to the mixers, in which operation it will be loosened and aerated again prior to use. As shown in Fig. 14, the bin 28 is provided with discharge pipes 47 leading from its hopper bottom to the several mixers and provided with valve controlled discharge nozzles 48 at their delivery ends. These nozzles may include or have incorporated therein suitable means for increasing the aerating action of the air on the flour if desired. As here shown also a compressed air supply pipe 49 is provided, which may lead from a suitably located compressor, and from which extend branch pipes 50 and 51 having suitable controlling valves 52, the pipe 51 leading to a coiled discharge pipe 29' in the storage pin 28 and the pipe 50 leading to the bottom of the bin adjacent to its discharge outlet. As the flour from the pipe 29 enters the top of the bin 28 it is blown against the coil 29' so as to physically break up or loosen up the flour and at the same time the flour is subjected to the action of the streams of air or blast of air delivered by the coil 29' whereby it is further broken up and aerated. The air from the coil 29' also supplies a pressure on the flour within the bin to effect its discharge through the outlet at the bottom of the bin, where it is again subjected to the loosening discharge pressure and aerating action of the air from the pipe 50. By this means the trouble and expense of aerating the flour at the bakery and as an operation supplemental to its feed action, is avoided and the flour automatically maintained in best condition for use during and as an automatic part of the work of handling the same.

The advantages gained in the handling of flour by my improved method and apparatus may also be gained to a greater or less degree in the handling of other cereals and materials, such as grain, seed, malt and other like commodities which tend to pack and heat and burn by spontaneous combustion, the operation of feeding and aerating the material by the action of compressed air tending in all such cases not only to loosen up the material but to keep it from heating. The same advantage gained in the transportation of flour in sealed receptacles also applies to the shipment of grain, seed, malt and like products, in that the material is isolated against exposure to atmospheric conditions or to the access of foreign materials thereto, so that it will not only be protected during transit from contamination and the ravages of insects, but also from physical damage and deterioration liable to be caused by exposure.

Other advantages of the method will be readily understood and appreciated by railroads and shippers and users of goods of the character mentioned and of other similar goods. It will be evident that an advantage of importance gained is that the method of packing and transporting the material is exceedingly flexible and takes care of all required conditions, in enabling the material either to be directly transported from a source of origin to a point of use in a single container and with but one unloading action, or in enabling materials to be shipped, without loading change, and with but one transport vehicle change, between a shipping point and a destination point, and in reducing the transfer of material from one container to another to a single transfer in which material is not exposed so as to be subject to injury, where railroad and compressed air supply facilities are not immediately available at the destination point. The method, in addition to securing the various economies above mentioned, is also economical in reducing loss of material in transit, and claims for such losses, as well as in giving railroad and associated transportation agencies a fifty percent or more increase in pay load or amount of material that may be shipped at a given time, thus solving a problem which has heretofore existed because of unsuccessful work to obtain suitable loads of flour and other like commodities. It will, of course, be understood that this system also permits of the delivery of less than carload lots to consignees, and even less than single container lots, so that given amounts of material stored in a container may be delivered to different consignees by properly governing the packing or controlling the discharge of the material.

Figure 5:
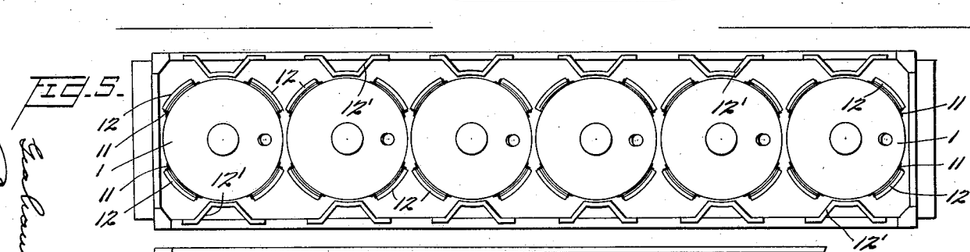
Fig. 5 is a top plan view of the same.
Figure 6:
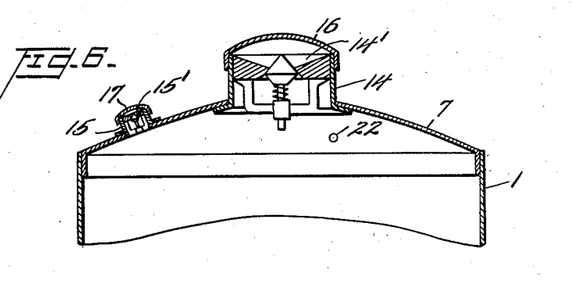
Fig. 6 is a vertical section through the top of one of the containers.
Figure 7:
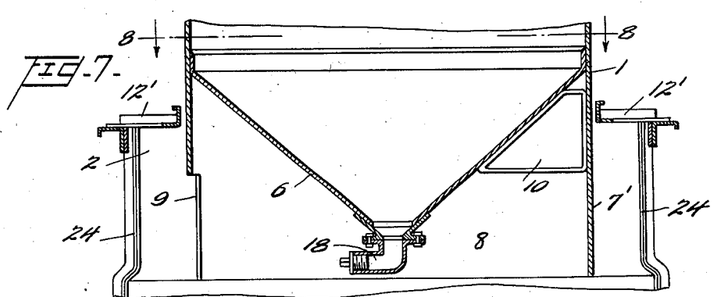
Fig. 7 is a similar section through the bottom of one of the containers.
Figure 8:
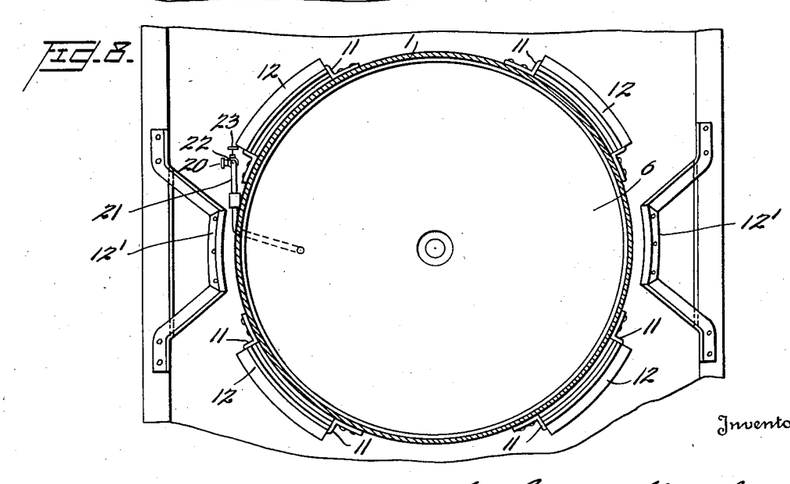
Fig. 8 is a horizontal section on line 8—8 of Fig. 7.

It will be understood that instead of loading the containers on the car in a longitudinally alined series, as shown for example in Fig. 5, the containers may be disposed in a staggered manner, as shown in Fig. 9, and held in position by holding devices similar to those shown in Fig. 5.

While the particular method disclosed, and means for carrying the same into practical effect, is preferred, it will, of course, be understood that variations in the steps of the method and changes in the mechanical agencies employed may be made within the scope of the appended claims without departing from the spirit or sacrificing any of the advantages of the invention.

What I claim is:—

1. The method of transporting flour and like pulverulent materials in bulk between a shipping point and a receiver at a destination point so as to protect the material during shipment and to deliver it in a loose and suitably aerated condition for use in making products therefrom, which consists in storing and shipping the pulverulent material from shipping to destination point under superatmospheric head pressure in containing means hermetically sealed against communication with the ambient atmosphere, discharging the material from the containing means under atmospheric head pressure through a conductor into a receiver at the destination point while simultaneously loosening it up and aerating under disruptive pressure on its emergence from the containing means and passage into the conductor, and subjecting the material on its passage from the conductor into the receiver to a mechanical spreading action and to the aerating action of streams of injected air.

2. The method of transporting flour and like pulverulent materials in bulk between a shipping point and a receiver at a destination point so as to protect the material during shipment and to deliver it in a loose and suitably aerated condition for use in making products therefrom, which consists in storing and shipping the pulverulent material from shipping to destination point under superatmospheric head pressure in containing means hermetically sealed against communication with the ambient atmosphere, discharging the material from the containing means under atmospheric head pressure through a conductor into a receiver at the destination point while simultaneously loosening it up and aerating under disruptive pressure on its emergence from the containing means and passage into the conductor, blowing the material from the conductor into the receiver against a surface acting to spread the material, and subjecting the material as spread to the aerating action of streams of injected air.

3. The method set forth in claim 1 wherein the material entering the receiver is blown against a perforated spreading surface, aerated by blasts of air injected through said surface, and discharged from the receiver into final receptacles under the pressures in the receiver augmented by a disrupting blast of air at its point of discharge from the receiver.

GRAHAM C. WOODRUFF.